No. 761,082. PATENTED MAY 31, 1904.
L. V. LABELLE.
RECORD MAKING APPARATUS FOR WEIGHING SCALES.
APPLICATION FILED JULY 14, 1900. RENEWED SEPT. 18, 1903.
NO MODEL. 5 SHEETS—SHEET 1.
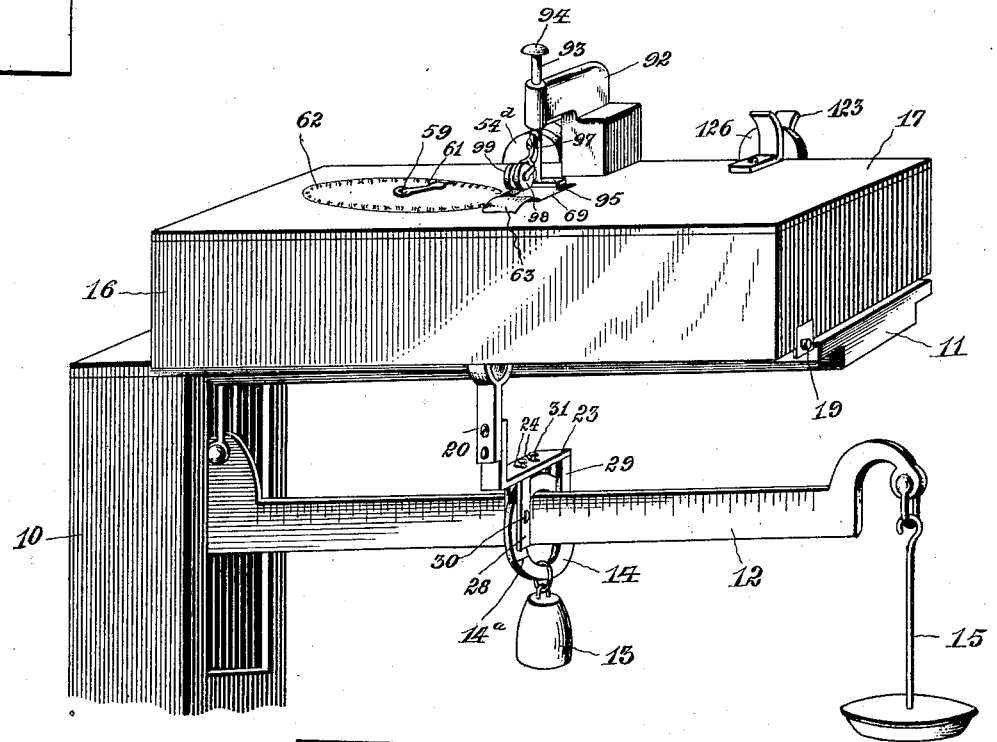
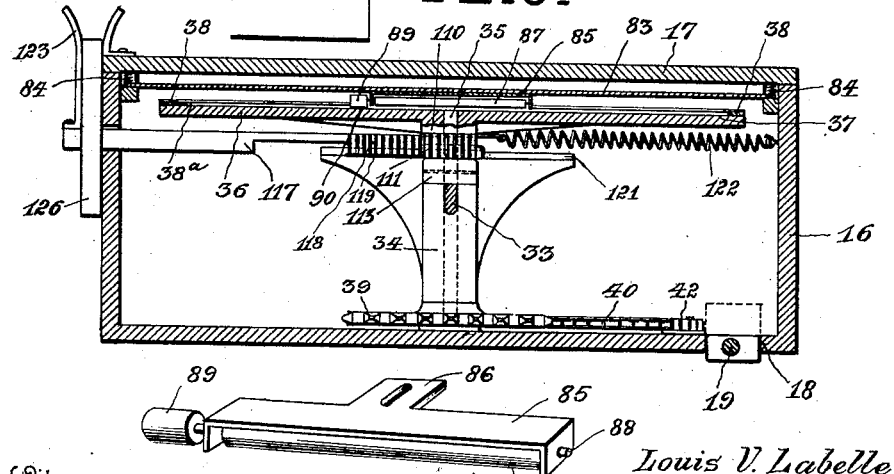
Witnesses:
Louis V. Labelle,
Inventor
By Marion & Marion
Attorneys No. 761,082. PATENTED MAY 31, 1904.
L. V. LABELLE.
RECORD MAKING APPARATUS FOR WEIGHING SCALES.
APPLICATION FILED JULY 14, 1900. RENEWED SEPT. 18, 1903.
NO MODEL. 5 SHEETS—SHEET 2.
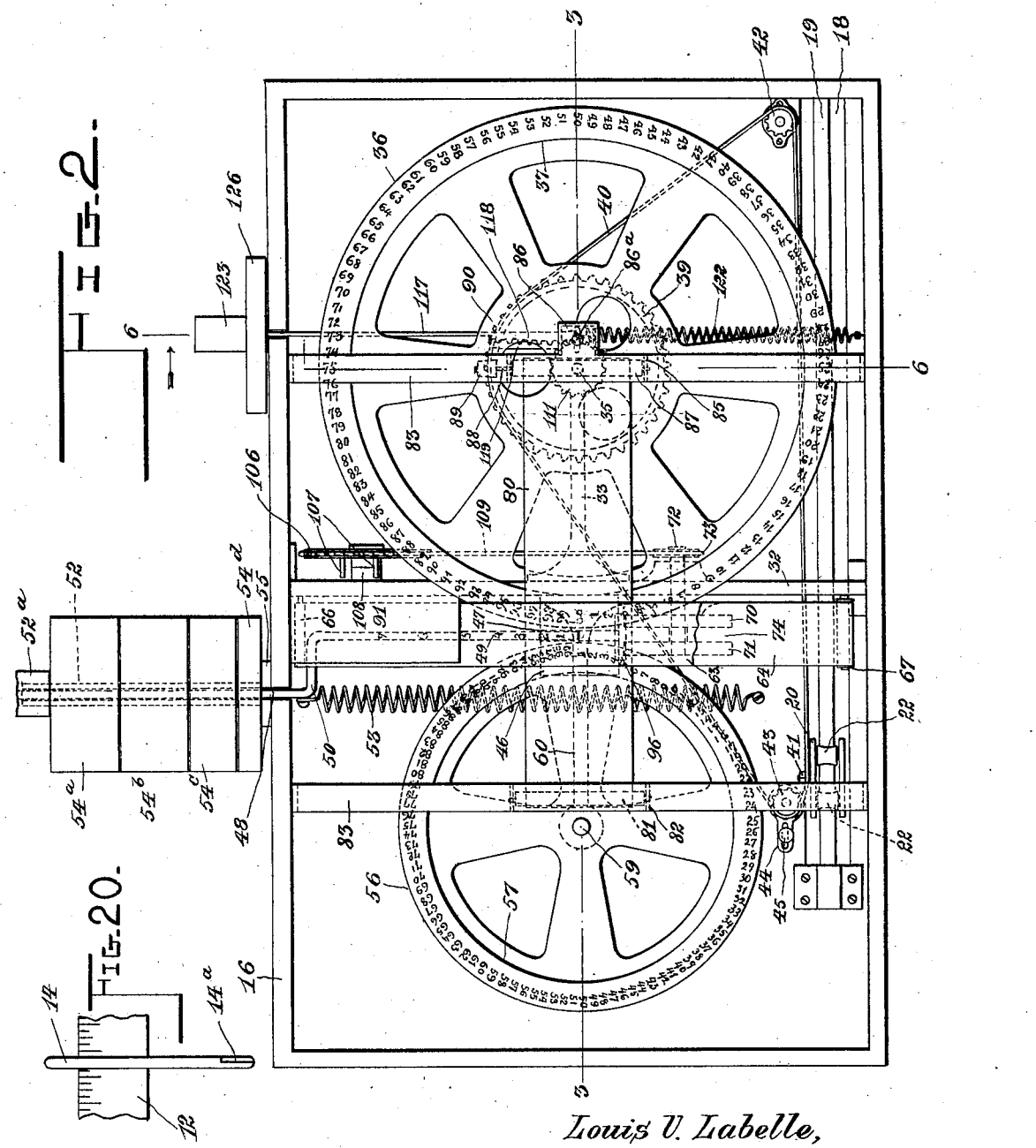
Louis V. Labelle,
Inventor
Witnesses:
By Marion & Marion
Attorneys

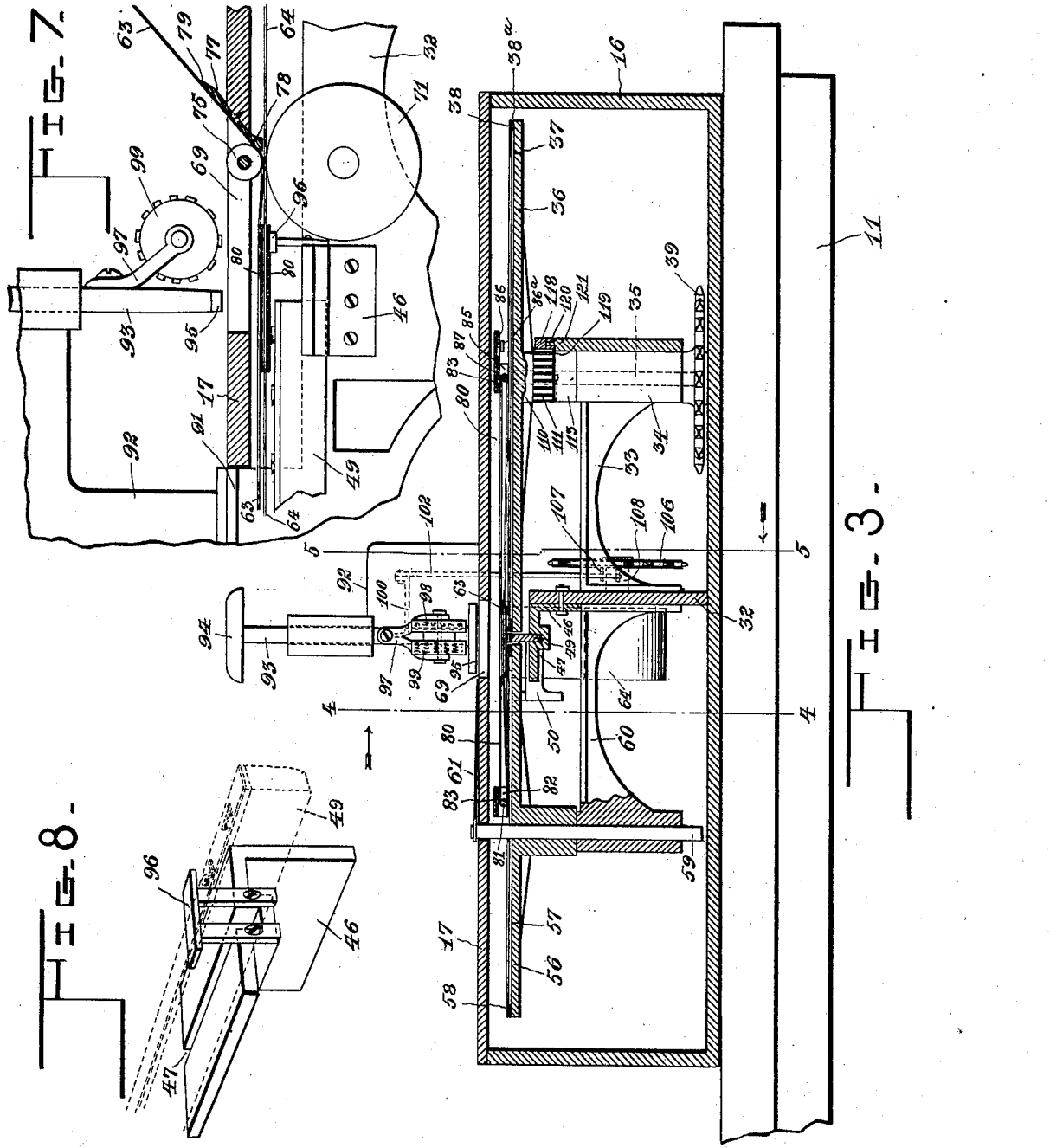

No. 761,082. PATENTED MAY 31, 1904.
L. V. LABELLE.
RECORD MAKING APPARATUS FOR WEIGHING SCALES.
APPLICATION FILED JULY 14, 1900. RENEWED SEPT. 18, 1903.
NO MODEL. 5 SHEETS—SHEET 4.
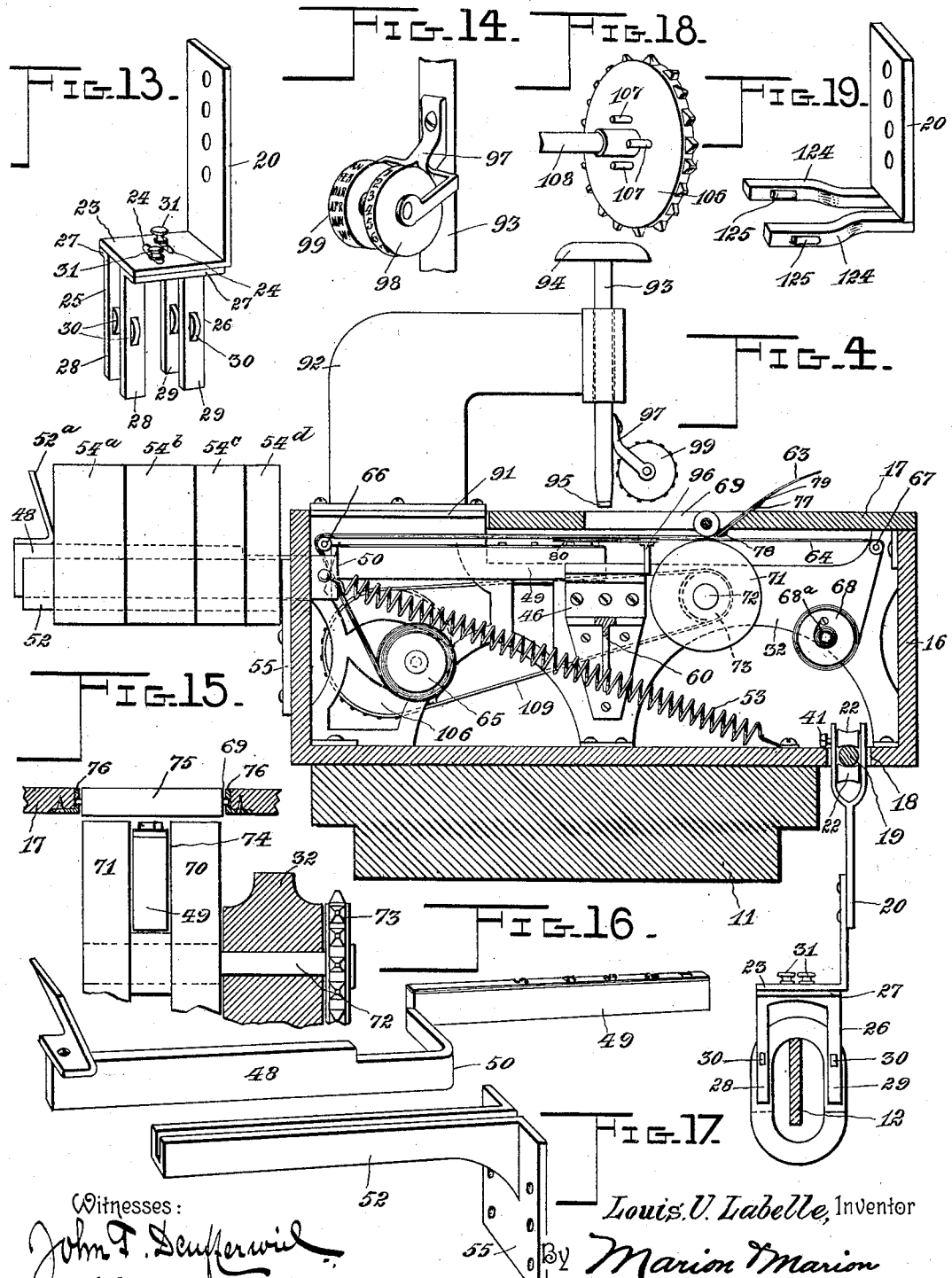
Witnesses:
Louis V. Labelle, Inventor
By Marion & Marion
Attorneys

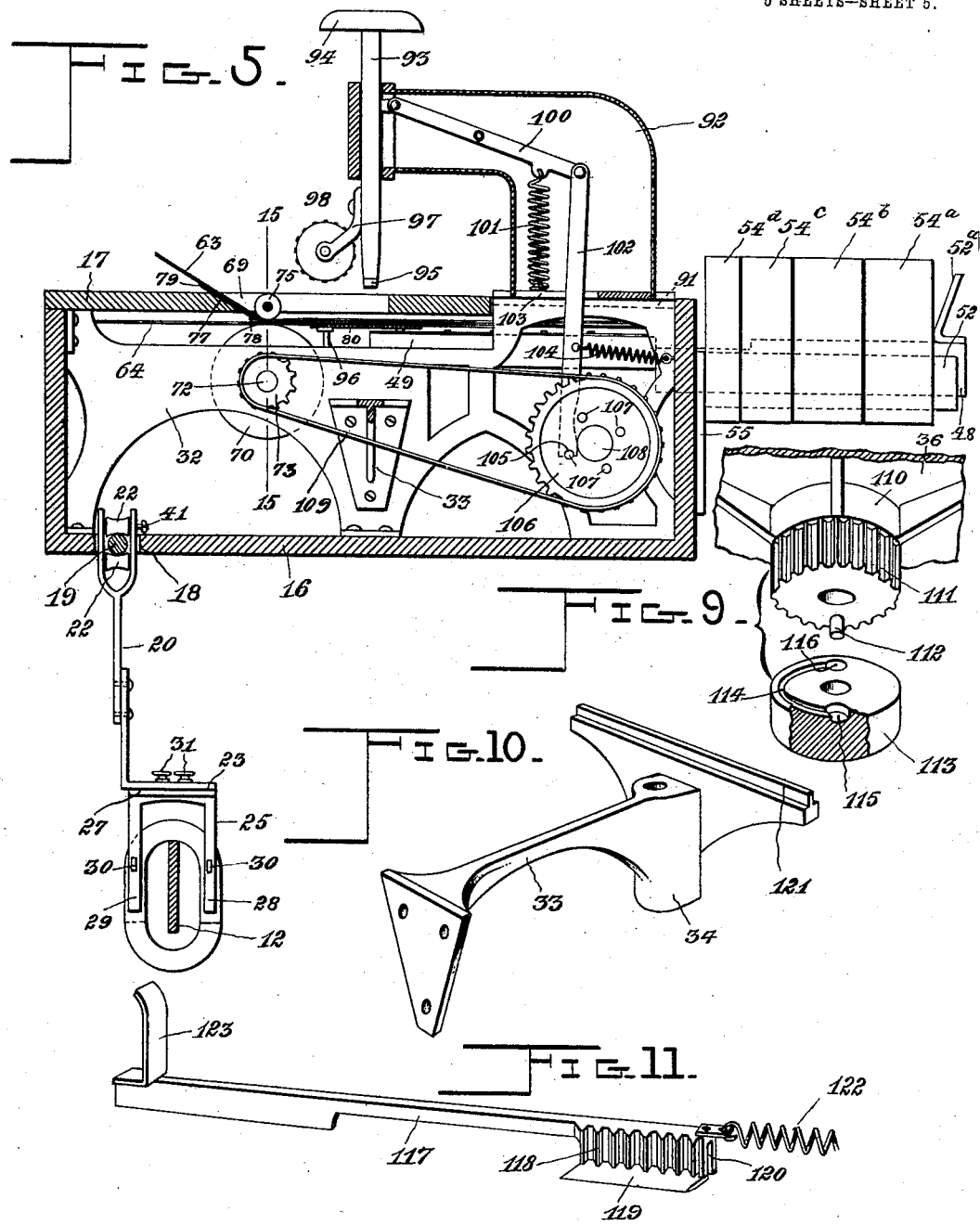

No. 761,082. Patented May 31, 1904.

UNITED STATES PATENT OFFICE.

LOUIS V. LABELLE, OF ST. JACQUES DE L'ACHIGAN, CANADA.

RECORD-MAKING APPARATUS FOR WEIGHING-SCALES.

SPECIFICATION forming part of Letters Patent No. 761,082, dated May 31, 1904.

Application filed July 14, 1900. Renewed September 18, 1903. Serial No. 173,730. (No model.)

*To all whom it may concern:*

Be it known that I, LOUIS V. LABELLE, a subject of Her Majesty the Queen of Great Britain, residing at St. Jacques de l'Achigan, in the county of Montcalm, Province of Quebec, Canada, have invented certain new and useful Improvements in Record-Making Apparatus for use in Connection with Weighing-Scales; and I do hereby declare that the following is a full, clear, and exact description of the invention, such as will enable others skilled in the art to which it appertains to make and use the same.

My invention relates to a record-making machine adapted for use in connection with weighing-scales.

In some sections of the country it is customary for farmers and others to carry milk to creameries, and accurate accounts in duplicate should be kept by the receiving-clerk and the patron of the various quantities of milk delivered from day to day by the patron.

The object of this invention is to provide a machine which will attain these ends by a simple construction and arrangement of parts.

A further object is to provide the recording mechanism with means shiftable with the scale-beam counterpoise and permitting the latter to play so freely as to prevent any interference with the balancing of the scale to determine the exact weight of the load on the scale-platform.

A further object is to provide a patron-indicating mechanism operable independently of the weight-indicating mechanism and adapted to be brought into such position that its characters will aline with those of the weight-indicating mechanism, so as to inscribe the weight of the load and the patron's number or character on a common line on a record.

A further object is to provide means by which the weight-record is accurately obtained up to the weighing capacity of the scale.

A further object is to provide means by which the record is attained in duplicate, one part of such record being retained in the machine and the other part adapted to be delivered to the patron in the form of printed slips.

A further object is to provide a novel impression and inking mechanism adapted to be used in connection with all the shiftable elements of the weight and patron indicating mechanisms, and these impression devices carry a dating stamp or device and also actuate the means for feeding the duplicate record tapes or ribbons.

Further objects and advantages of the invention will appear in the course of the subjoined description, and the novelty in the combination of mechanisms and in the construction and arrangements of parts will be defined by the claims.

In the drawings hereto annexed and forming a part of this specification, Figure 1 is a perspective view of a portion of an ordinary platform weighing-scale with my improved recording mechanism applied in operative position thereto. Fig. 2 is an enlarged view, in plan, of the impression devices, the casing top or cover being removed and the plunger and dating mechanism omitted. Fig. 3 is a vertical longitudinal sectional view taken in the plane indicated by the dotted line 3 3 on Fig. 2. Fig. 4 is a vertical transverse section taken in the plane of the dotted line 4 4 on Fig. 3 looking in the direction of the arrow. Fig. 5 is another vertical transverse section taken in the plane of the dotted line 5 5 on Fig. 3 and looking in the opposite direction as indicated by the arrow. Fig. 6 is another vertical transverse section taken in the plane of the dotted line 6 6 on Fig. 2. Fig. 7 is an enlarged detail sectional elevation illustrating the position of the parallel record tapes or ribbons, the inking-ribbon, a part of the means for feeding the record tapes or ribbons, and the impression plunger and dating devices. Fig. 8 is a detail perspective view of the guide-plate for the slidable bar which constitutes one shiftable element of the weight-indicating mechanism, also showing in detail the small bed or table for the dating-wheels. Fig. 9 is a detail perspective view of certain parts associated with the revoluble indicating element, by which the latter may be adjusted independently of the shiftable movement of the traveler which is associated with the hanger of the counterpoise on the scale-beam. Fig. 10 is a detail perspective view of the bracket adapted to support the revoluble weight-indicating element.

Fig. 11 is a detail perspective view of an adjusting rack-bar to effect the independent movement of the revoluble weight-indicating element. Fig. 12 is a detail perspective view of the adjustable bracket for supporting one roller of the inking-ribbon in order to keep the latter taut. Fig. 13 is a detail perspective view of a part of the traveler which is shiftable with the scale-beam poise. Fig. 14 is a detail perspective view of the printing-wheels and the supporting-plate therefor which form the dating device. Fig. 15 is a detail sectional elevation in the plane of the dotted line 15 15 on Fig. 5. Fig 16 is a detail perspective view of the auxiliary shiftable weight-indicating device adapted for use in connection with the revoluble indicating-disk. Fig. 17 is a detail view of a guide for the shiftable bar shown by Fig. 16. Fig. 18 is a detail perspective view of the feed-wheel adapted for use in connection with a plunger-actuated feed-bar and a gear element that rotates a feed-roll for the record tapes or ribbons. Fig. 19 is a detail perspective view of a modified form of traveler adapted for use in connection with a counterpoise which fits directly on a scale-beam—that is to say, is not connected by the hanger or ring. Fig. 20 is a detail view, in edge elevation, of another form of the poise ring or hanger fitted to a portion of a graduated scale-beam.

The same numerals of reference are used to indicate like parts in each of the several figures of the drawings.

In Fig. 1 of the drawings I have shown my record-making apparatus operatively-applied to an ordinary platform-scale, in which a part of the scale column or post is indicated by the numeral 10 and is provided with the usual head-block 11. The scale-beam 12 is mounted in the column or post and connected with the usual platform mechanism. The poise 13 is provided with a ring or hanger 14, which is shiftably fitted on the graduated beam, and said beam carries a scale-weight hanger 15, on which may be placed one or more of the different scale-weights. All these parts are ordinary in the art, and it will be understood that no novelty therefor is claimed in this application.

Nearly all of the operating mechanisms of my improved recorder are housed within a suitable casing 16, which is secured in any suitable way on the head-block 11, the top side of this casing being closed by a removable cover 17. In the bottom of this casing is provided a longitudinal slot 18, within which is arranged the horizontal guide-rod 19 for the shiftable traveler 20, the latter being slidably fitted on the guide-rod and connected with the scale-beam poise or the poise-hanger, so as to be shiftable therewith, for the purpose of accurately adjusting the revoluble weight-indicating element of the recorder. The traveler which I prefer to employ is made extensible or adjustable in the direction of its length for the purpose of enabling said traveler to be used in connection with scales and my recording apparatus in cases wherein the distance between the scale-beam and the recording apparatus may vary, owing to the recording apparatus being used on different sizes or makes of scales. The extensibility of the traveler is obtained by making the shank thereof in two parts, as clearly shown by Figs. 4, 5, and 13. One part of the traveler-shank is provided with a series of openings which may be internally threaded, and the other part of the traveler-shank has a like series of openings whereby the two members of said traveler-shank may be brought into overlapping relation and secured together detachably by means of screws. (See Figs. 4 and 5.) The upper end of one traveler member is forked to support the pair of rollers 22, that travel against the gude-rod 19, said forked end of the traveler extending through the slot 18 and into the lower part of the casing 16. The other member of the traveler has an angular end 23, which is disposed immediately over the scale-beam 12, and in this angular end is formed the transverse slots 24, which provide for the adjustment of the set-screws 31, which serve to adjustably fasten the foot-pieces 25 26 to the angular end of the traveler. These foot-pieces are constructed, as shown more clearly by Fig. 13, to embrace the poise hanger or ring and the scale-beam on which the latter is fitted, and each foot-piece consists of a plate 27 and a pair of branches 28 29. The plates 27 of the two foot-pieces are fastened to the angular end 23 of the traveler by the set-screws 31, which pass through the slots 24, and these foot-pieces are arranged parallel to each other, so that the poise-hanger will fit between the opposing branches of the two plates, while at the same time the branches on each plate are spaced at proper intervals for the scale-beam to fit loosely between the same. The branches are provided with the antifriction-rollers 30, that serve to minimize the frictional engagement of the poise-hanger with the foot-pieces and, in fact, the chief aim of this traveler is to provide a means which while being shiftable with the scale-beam poise will offer a minimum resistance to the movement of the poise and the scale-beam in order to attain accuracy in weighing the load on the scale-platform. The traveler is extensible, as hereinbefore set forth, to accommodate the recording mechanism to different scales in which the guide-rod 19 of said recording mechanism may lie at varying heights above the path of the scale-beam counterpoise, and the foot members of said hanger are adjustable laterally with respect to each other to permit poise hangers or rings of different thicknesses to play in the space between said foot members.

32 designates a pillar-plate secured firmly within the casing near the middle thereof and which furnishes a support for the several movable indicating or impression devices of the recorder. From one side of this pillar-plate extends a bracket 33, the latter having at its free end a bearing 34, in which is mounted a vertical shaft 35. The upper portion of this shaft carries a weight impression or indicating member which is represented in the form of a revoluble disk 36 in the present embodiment of the invention. This member or disk is disposed in a horizontal position within the casing substantially at one side of the pillar-plate; but one edge of this revoluble member or disk is adapted to extend or project over the pillar-plate, as shown by Figs. 2 and 3. Said revoluble member or disk is furthermore provided on its upper surface with a flat annular face 37, on which is seated a stereotyped impression or printing surface 38, an intermediate wooden block 38$^a$ being fitted between the face 37 and the printing-surface 38. This stereotype is prepared in accordance with the graduations on the scale-beam with which the recorder is to be associated, and the employment of said stereotyped surface enables accuracy to be obtained in the operation of the recorder mechanism and at the same time insures a durable and satisfactory printing-surface. The lower part of the vertical shaft 35 carries a sprocket-gear 39, with which engages an endless sprocket-chain 40, that is secured at the point indicated by 41 to the shiftable traveler, which loosely embraces the poise-hanger. This chain passes around a suitable guide-roller 42 in the form of a sprocket, journaled on a proper plate, (see Fig. 2,) and the chain also passes around a sprocket-roller 43, which is journaled in a bearing-plate 44, having a slotted arm, through which passes a binding-screw 45, as also clearly shown by Fig. 2, whereby slack in the chain may be taken up and the latter maintained in a taut condition to secure efficiency in the operation of the revoluble member or disk. On the opposite side of the pillar-plate 32 from the bracket-arm 33 is secured a horizontal guide-plate 46, which is angular in form and is fastened firmly to one vertical face of said pillar-plate by suitable screws. The upper horizontal portion of this guide-plate is formed with a channel or groove 47, in which is slidably fitted an auxiliary element of the weight indicating or impression mechanism, the latter being supplemental to the revoluble member or disk 36. This supplemental or auxiliary member is preferably embodied in the form of a slidable bar 48, which is provided with a length 49 and the bend or offset 50, whereby the two lengths of the slidable bar are out of alinement one with the other, as shown by Fig. 16. The length 49 of the slidable bar is fitted in the channel or groove of the angular guide-plate 46, whereby that length of the bar which is disposed within the casing is supported in a position adjacent to that edge of the revoluble member or disk 36 which projects over the pillar-plate. Said length 49 of the slidable bar is provided on its upper edge with a series of numerals. (Shown by Fig. 16 as from "1" to "5," inclusive, although the number employed may be increased or diminished, as desired.) The numbers may be stereotyped on the bar or formed thereon in any suitable way. The length 48 of the slidable bar extends beyond one side of the casing through a suitable opening in the latter, and this extended length of the bar is supported and guided in an external grooved guide-bracket 52, which is secured to the outside of the casing. (See Figs. 4 and 17.) The slidable bar has the numerals on its length 49 in the same horizontal plane as the numerals on the revoluble member or disk, and these numerals on the slidable bar are shiftable with relation to the printing or impression surface on said member or disk 36. I have provided means by which the slidable bar may be adjusted to variable predetermined positions to bring the figures or numerals on its length 49 into registration or an index position with relation to the numerals on the stereotyped printing-surface of said revoluble member, and while various means for giving such adjustment to the bar 48 may be adopted I prefer to employ the series of scale-weights of different thicknesses, either of which may be superimposed on the hanger 15 of the scale-beam, according as it is desired to increase the weighing capacity of the scales. A series of these scale-weights 54$^a$ 54$^b$ 54$^c$ 54$^d$ are fitted on the protruding length 48 of said slidable bar, which is supported or upheld by the guide-bracket 52. An inclined plate 52$^a$ is fastened to one end of the protruding length of the bar 48, so that one of the scale-weights will bear against the same, while the scale-weight at the other end of the series bears against a wear-plate 55. A coiled spring 53 is connected to this slidable bar at a point within the casing to afford a means for normally drawing said bar inwardly; but this action of the spring is resisted by the interposition of the series of weights upon the bar and between the plate 52$^a$ and the plate 55. With the series of scale-weights in position, as shown by the drawings, the slidable bar is held in position for a blank space thereof or its end to be opposite to the index position of the impression or indicating elements of the recorder; but the removal of any one of these weights permits the spring to draw the slidable bar inwardly a distance corresponding to the thickness of the weight so removed, whereby a numeral on the length 49 of the bar is brought opposite to the index position of the impression or indicating elements of the machine. Assuming that the scale-beam is graduated to weigh one hundred pounds and the fractions of pounds, the stereotyped surface of the revoluble member or disk 36 is correspondingly graduated. The series of four scale-weights of different thicknesses may be employed on the scale-beam hanger to weigh up to five hundred pounds or one thousand pounds. With the series of weights in place on the slidable bar the revoluble member or disk 36 is adapted to print a record of weights in pounds up to one hundred, thus corresponding to the capacity of the scale-beam without the employment of any of the weights thereon. The removal of the thinnest weight $54^a$ for use on the scale-beam hanger to permit the scale to weigh up to two hundred pounds and thereunder allows the spring 53 to draw the bar 48 inwardly a sufficient distance so as to present the numeral 1 in the index position opposite to the position assumed by the numeral of the revoluble member or disk 36 when the latter shall have been adjusted to the proper index position by the shiftable movement of the scale-poise to obtain the accurate weight of the load on the scale-platform.

I have also provided my improved recorder mechanism with an impression or indicating member adapted to indicate on the tapes or ribbons which are printed upon by the weight-indicating members 36 48 a record of the number or character of the patron who may deliver the milk in various quantities to the creamery. The list of patrons may be numbered from one upwardly, or they may be indicated by reference-letters, or any other character may be adopted to denote the various patrons in the list. This patron-indicating member or element is shown in the present embodiment of the invention in the form of a disk 56, which is arranged in the same horizontal plane as the members 36 48 heretofore described, said member 56 being disposed on the opposite side of the pillar-plate from the disk 36, so that the length 49 of the slidable member or bar 48 will lie in a position between the contiguous edges of the two disks 36 56. (See Figs. 2 and 3.) Said patron-impression member or disk 56 is provided with a flat annular face 57, upon which is seated a stereotyped plate or ring 58, which contains the names, numbers, or reference characters of the list of patrons, said stereotyped plate being disposed in the horizontal plane of the impression-surfaces on the impression members 36 49, so that either of the names, numbers, or characters on the impression member 56 may be brought to the index position, so as to correspond with the record produced by the impression members 36 49 individually or collectively on the record tapes or ribbons. Said member or disk 56 is carried by a vertical shaft 59, which is journaled in a bearing of a horizontal bracket 60, the latter being secured to the pillar-plate below the angular guide-plate 46. (See Fig. 3.) The upper part of this vertical shaft 59 extends through a suitable opening in the top of the casing, at which point said shaft is provided with an index finger or pointer 61, the latter being adapted to traverse a dial 62, provided or inscribed upon the top 17 of the casing, said dial having names, numbers, or characters corresponding to those on the patron-impression member or disk 56.

It is my purpose to make the improved machine produce a record in duplicate, one of which may be retained in the machine-casing, while the other may be torn off in the form of slips to be delivered to the patrons. I therefore employ record tapes or ribbons 63 64, arranged parallel to each other and close together, as shown by Figs. 2, 3, 4, 5, and particularly Fig. 7. These record tapes or ribbons, which may be of paper or any other suitable material, are coiled on a supply-spool 65, which is suitably mounted on the pillar-plate at a point below the slidable bars 48 49. These ribbons pass in an upward direction over the roller 66, thence in a horizontal direction below the top or cover of the casing and over the impression-surfaces of the three impression members 36, 49, and 56 of the recorder, one of said tapes or ribbons extending through a slot 69 in the cover, while the other tape or ribbon passes around a roller 67 and is thence coiled on the take-up spool 68, all as clearly shown by Fig. 4, said take-up spool 68 being impelled or driven normally in one direction by any suitable means, such as a coiled spring $68^a$, which has a tendency to coil said tape on the spool 68 and to keep the under ribbon 64 in a taut condition. The slot 69 in the cover is formed at a point over the index position adapted to be assumed by either of the characters on either of the three shiftable members of the recording-machine, and beneath this slot is adapted to travel the record tapes or ribbons and the transversely-movable endless inking-ribbon, while the impression-plunger and the dating-stamp are adapted to play through the slot 69 in order to make the inscription on the faces of the record tapes or ribbons 63 64. To feed the ribbons or tapes positively after each impression thereon by the action of the plunger, I employ a set of feed-rolls arranged to frictionally grip the ribbons at a point to one side of the inking-ribbon, which lies over the impression-surfaces of the three impression members 36 49 56. One member of this feed mechanism is a divided feed-roll having the parallel members or disks 70 71 and mounted on a horizontal shaft 72, which is journaled in a bearing of the pillar-plate, (see Fig. 15,) said shaft 72 extending through the pillar-plate, so as to receive a sprocket-gear 73, the purpose of which will hereinafter appear. The members of the divided feed-roll are separated to provide an intermediate space 74, in which is free to play an end portion of the slidable bar 49, whereby the feed-roll is constructed in a peculiar way to lie close to the index position of the three impression members 36 49 56, so that said feed-roll may properly engage with the record tapes or ribbons. With the divided feed-roll coacts the other feed-roll 75, which is of small diameter as compared with the divided roll and is arranged above the latter, so as to lie within the slot 69 of the cover. This upper smaller feed-roll is journaled in suitable bearing-plates 76, secured to the edges of the slot 69, (see Fig. 15,) and said roll 75 is disposed in such close relation to the divided feed-roll as to coact therewith in gripping and feeding the record-tapes when the divided roll is positively actuated by the means to be presently described. The upper tape or ribbon 63 is positively separated from the lower tape or ribbon 64 as they emerge from the coacting rolls by means of a divider-plate 77, which is secured in an inclined position to the cover, so as to extend through the slot 69. This plate has a lower thickened edge 78, which lies close to the roll 75 and is interposed in the path of the upper tape 63, which is adapted to be deflected away from the tape 64 and to travel across the face of the plate 77. The upper edge 79 of the divider-plate 77 is sharpened to constitute a cutting edge across which the tape or ribbon 63 may be torn into sections or lengths which contain the desired record inscriptions and which constitute a check or ticket to be delivered to the patron.

80 designates the endless inked ribbon which is arranged in a horizontal position on the under side of the cover, although it is not supported thereon. This inked ribbon is endless to provide two lengths or leads for giving the desired inscriptions upon the duplicate record-tapes, and this endless ribbon is arranged in a position at right angles across the record-tapes, as shown by the drawings, and particularly by Fig. 2. Said inked ribbon is supported at one end by an idle roll 81, which is mounted in a bracket 82, fastened to a bar 83, extending across the machine above the patron-impression member or disk 56. The other end portion of this endless ribbon is supported by a feed-roller 87, which is adapted to be positively driven, so as to present fresh surfaces of said inked ribbon to the impression-faces on the impression members, and this feed-roller is mounted in an adjustable bracket 85, which may be shifted to take up slack in said ribbon. The bracket 85 has a slotted tongue 86, through which passes an adjustable screw 86ª. This bracket is fastened to a vertically-yieldable bar 83, sustained by springs 84, as shown by Fig. 6, in order to permit the roller and the bracket to be raised or lowered with the revoluble disk or member 36 when the latter is actuated independently of the shiftable movement which it ordinarily is capable of in unison with the shiftable movement of the traveler and the counterpoise, as will hereinafter appear. The shaft 88 of this feed-roller 87 is provided with the frictional element 89, arranged to have sufficient frictional engagement with the annular track-surface 90 on the disk or member 36 to insure the rotation of the feed-roller 87 at the same time that the member or disk 36 is turned by the chain on the adjustment of the traveler with the scale-beam poise.

The pillar-plate 32 is provided near one end with an upstanding bearing-plate 91, which passes through a suitable opening in the cover of the casing, and this bearing-plate supports a hollow stand 92, the latter being fastened to the plate 91 in any suitable way. This hollow stand has an end overhanging the slot 69 in the cover, and in said overhanging end is slidably mounted a vertically-reciprocatory impression-plunger 93, the latter having an impact-head 94 and a transverse impression-foot 95. The foot of this plunger is adapted to pass through the slot 69 in the cover, so as to act upon the tapes and the inked ribbon in order to press the latter upon the impression-surfaces of the impression members. A small narrow table 96 is attached to the angular guide-plate 46 or to a part of the pillar-plate, so as to lie above the horizontal plane of the impression-surfaces on the impression members at one side of the index position of said members and below the inked ribbon at one edge of the latter. (See Fig. 7.) This table is adapted to receive the impact of the dating-wheels, which are carried by a plate 97, attached to the impression-plunger, so as to lie at one side of the impression-foot 95 thereof. The impression-wheels of the dating-stamp are indicated at 98 99, and, as shown by Figs. 7 and 14, these wheels are provided with letters and numerals to indicate the month and day of the month. The dating mechanism is thus mounted directly on the impression-plunger, so as to be movable therewith, and this plunger and the dating mechanism are sustained normally in a raised position clear above the table by the action of a spring-actuated lever 100, which is arranged within the hollow stand 92. (See Fig. 5.) This lever is fulcrumed at a point intermediate of its length. One end thereof is pivoted to the impression-plunger, and near the other end is connected a retracting-spring 101. The plunger of the impression mechanism actuates means by which the divided feed-roll 70 71 for the record-tapes may be positively rotated. The feed mechanism associated with the feed-roller includes as one element a vertically-disposed feed-bar 102, which is pivotally connected to one end of the lever 100 and is arranged to play in a slot 103 in the bottom plate of the stand 92 or the bearing-plate 91, on which the stand is secured, said slot 103 arranged to limit the movement of the lever in one direction under the action of a coiled spring 104, the latter serving to give a limited movement to the feed-bar 102 in a horizontal direction and independently of the movement which is given to said feed-bar by the action of the lever 100. This feed-bar is provided with a forked or notched foot 105 and is arranged to engage successively with a series of pins or studs 107 on the feed-wheel 106. Said feed-wheel is in the form of a sprocket having a shaft 108 idly journaled on the pillar-plate, so that the wheel is in alinement with the sprocket-gear 73 on the shaft of the divided feed-roll, and this wheel 106 is connected by the endless sprocket-chain 109 to said wheel 73 in order to rotate the divided feed-roll a certain distance each time that the plunger 93 is pressed downwardly. It will be noted that the downward movement of the plunger 93 lifts the bar 102 free from one stud on the feed or spocket wheel 106, so that the spring 104 will pull the bar 102 the distance permitted by the slot 103, so that the forked foot of the bar will engage with the next pin or stud on the feed-wheel. The return movement of the plunger 93 rotates the feed-wheel and the feed-rolls.

It is well known that some platform-scales are provided with scale-beams which are graduated up to one hundred pounds and fractions thereof, whereas other weighing-scales are of smaller capacity in that the scale-beams thereof are graduated only up to fifty pounds and fractions thereof, although by the use of the scale-weights on the weight-hanger the weighing capacity of the scale is increased up to two hundred or more pounds. It is my purpose to provide the revoluble disk or member 36 of the recording mechanism with a printing or impression ring having graduations corresponding to those of a scale-beam which is adapted to weigh one hundred pounds by proper adjustment of the counterpoise thereon; but to adapt the recorder mechanism having a member 36 graduated to one hundred pounds for use in connection with a scale the beam of which is graduated to weigh not over fifty pounds I have provided mechanisms by which the member 36 may be given a half-revolution independently of the adjustment imparted to said member 36 by shifting the traveler with the counterpoise. When the recording mechanism is used in connection with a scale-beam graduated to weigh fifty pounds, the traveler is operatively related to the counterpoise and to the weight-impression disk or member 36, so as to shift the latter to a position for either of its characters from one to fifty to be brought into the index position when the counterpoise is adjusted to the corresponding position on the scale-beam; but when an ordinary fifty-pound weight is placed on the hanger of the scale-beam it becomes necessary to change the position of the disk or member 36 so that its numerals from "51" to "100" may be brought into position for printing the proper number on the record-tapes on the adjustment of the counterpoise of the corresponding number on the scale-beam. This end is attained by reversing the position of the revoluble disk or member 36, and I will now proceed to describe the means for attaining this object.

The disk 36 is provided with a hub 110, which is fitted loosely on the vertical shaft 35, and this hub is formed with a gear-pinion 111 and with a depending stud 112. A clutch member 113 is made fast with the shaft 35 at a point below the disk 36, and in the top face of this clutch member is a semicircular groove 114, which terminates in the locking-recesses 115 and 116, the latter being deeper than the groove and disposed on diametrically opposite sides of the clutch member. A horizontal adjusting-bar 117 is arranged to extend through one side of the casing and adjacent to the gear 111 of the disk 36, said bar being formed with a rack-section 118 and with a laterally-extending lifting-plate 119, said lifting-plate being coextensive with the rack and extending beyond the teeth thereof. (See Fig. 11.) The bar 117 is furthermore formed with a groove 120, which receives a guide-rail 121 on the bracket 33, and this bar is thus directed to movement in a rectilinear path, so that the rack thereof may engage with the pinion 111 and the lifting-plate may fit between the clutch member 113 and the gear 111, whereby the lifting-plate is adapted to raise the disk 36 and its gear 111, so that the stud 112 may be withdrawn from the recess 115. This adjustment unclutches the disk 36 from the clutch member 113, and on the slidable movement of the bar 117 the rack 118 thereof turns the gear 111 and the disk 36 a half-revolution, the stud 112 traveling in the groove 114 until it reaches the recess 116, whereupon the plate 119 clears the gear 111 and the clutch member 113, so as to permit the disk 36 and the gear to drop for the stud 112 to enter the recess 116, and thereby couple the disk 36 in a reverse position to the clutch member 113. It will be understood that with the stud 112 in the recess 115 of the clutch member the disk 36 will be adjusted for its numeral "1" to occupy a correct position when the poise is adjusted at "1" on the scale-beam, and the movement of the poise to any position up to "50" on said scale-beam causes the disk 36 to be turned within a half-revolution, and thereby bring a corresponding number into the index position. By placing a weight on the scale-beam hanger to increase the weighing capacity of the scale the bar 117 is adjusted to reverse the position of the disk 36, so that the stud 112 will enter the recess 116. A movement of the poise on the scale-beam to weigh, say, sixty pounds will now adjust the disk 36 to bring the corresponding number "60" thereon into the index position, and this adjustment is true of any position up to one hundred pounds. The bar 117 is normally drawn into a position where the plate 119 and the rack 118 are freed from the gear 111 and the clutch member 113 by means of a spring 112, and to the protruding end of this bar is attached a pull-piece 123, which may be manipulated by hand or be pressed outwardly by thrusting a weight between one side of the casing and the pull-piece.

In Fig. 19 of the drawings I have represented another form of the traveler 20, which is adapted to be fitted directly to that class of counterpoises which are mounted slidably on the scale-beam without the employment of a ring or hanger. In this figure the traveler is provided with the forwardly-extending arms 124, having the friction-rollers 125, and these parts are arranged to engage directly with the angular round or square counterpoise of the class described in a manner which will be understood by those skilled in the art.

The operation of the machine may be described briefly as follows: Assuming that the record-making machine is applied to a weighing-scales the beam of which is graduated to weigh up to one hundred pounds and that the revoluble weight-impression member or disk 36 is provided with a stereotyped impression or printing surface graduated in conformity with the scale-beam, the first operation when a quantity of milk is delivered by a patron or customer to a creamery is to adjust the member or disk 56 to a position which will print the number or character of the patron on the record tapes or ribbons. This is attained by turning the pointer 61 to the proper numeral or character on the dial, and the movement of the pointer turns the member or disk to a position where the corresponding numeral or character is brought to the index position below the slot 69 in the top of the casing and immediately under the foot of the impression-plunger. The quantity of milk having been placed upon the platform of the scale, and assuming that said quantity weighs less than one hundred pounds, the counterpoise is moved along the scale-beam until the scale balances, and this adjustment of the counterpoise operates the traveler 20, which is shifted along the guide-rail 19 and actuates the sprocket-chain 40, which in turn rotates the vertical shaft 35, by which the weight-impression disk or member 36 is turned until the numeral thereon representing the weight is brought directly under the foot of the impression-plunger and in alinement with the reference numeral or character on the patron-impression member 56. It now only remains for the attendant to forcibly strike the head of the impression-plunger, so as to move the foot thereof and the dating-stamp through the slot 69 and upon the record tapes or ribbons and the inked ribbon. This depression of the plunger makes the desired impression from the impression or type characters of the members 36 56 upon both of the record-tapes 63 64, because one record-tape passes between the two leads of the inked ribbon and the other record-tape passes above the inked ribbon. At the same time that the record is inscribed upon the tapes or ribbons by the action of the members 36 56, the impression-plunger, and the inked ribbon, the proper date is inscribed upon said duplicate tapes by the dating-stamp coacting with the ribbon and the small table 96, and thus three records are simultaneously printed on the duplicate tapes—first, the patron's name, number, or character; second, the weight of the load, and, third, the date of delivery. The plunger is quickly elevated by the retractile force of the spring 101, and this actuates the feed-bar 102 to rotate the feed-wheel having the studs or pins a certain distance, which movement is communicated by the endless chain to the divided feed-roll 70 71, whereby the latter is positively turned to feed both record-tapes a certain distance. The tape 64 is coiled by the action of the spring $68^a$ on the take-up spool 68, while the other tape or ribbon 63 is deflected in an upward direction by the plate 77, so that the length of the ribbon 63, having the record printed thereon may be torn off by the cutting edge of the plate 77 and delivered to the patron or customer. Should the weight of the milk delivered by the customer exceed one hundred pounds, the weight $54^d$ is removed from the length 48 of the slidable bar and placed on the hanger of the scale-beam in order to increase the weighing capacity of the scale. This permits the spring 53 to draw the bar 48 49 inwardly, so that the numeral 1 on the length 49 of the bar will assume a position between the reference character or numeral on the patron-disk 56 and the weight-indicating number on the weight-disk 36, whereby on the operation of the plunger the numeral on the slidable bar will make an impression upon the record tapes or ribbons in line with the weight indicated by the operation of the disk or member 36, thus increasing the record capacity of the recording apparatus in harmony with the weighing capacity of the scale. It is of course understood that the removal of either of the other weights from the length 48 of the slidable bar permits said bar to be adjusted to a position which will bring a proper number into alinement with the numerals or characters on the disks 36 56, and thus the recording apparatus will print on the record-tapes the total weight of the load weighed by the scales up to the capacity thereof.

The use of my recording mechanism having the weight-impression member 36 provided with a printing-surface which is graduated up to one hundred pounds in connection with a scale-beam which is graduated to weigh only up to fifty pounds requires the bar 117 to be adjusted so as to change the position of the weight-impression member 36 whenever the load on the scale-platform weighs over fifty pounds. In the normal position of the apparatus the bar 117 is drawn in one direction by a weight 126, which is interposed between the finger-piece 123 and one side of the casing 16, thus holding the spring 122 in a distended condition. With the stud 112 engaged with the recess 113 the impression member 36 is adapted to be turned to present either of its numerals from "1" to "50" into position below the impression-plunger when the poise is shifted on the graduated beam to weigh a load of fifty pounds or thereunder, it being understood that the weight 126 holds the bar 117 and the spring 122 in the position shown by Figs. 2 and 6. Now should the load on the scale-platform exceed fifty pounds the weight 126, which is the usual "fifty-pound weight" supplied with ordinary scales, is removed from its place between the casing 16 and the finger-piece 123, and this weight 126 is fitted on the hanger 15, so as to make the scale-beam weigh a load up to one hundred pounds. The withdrawal of the weight 126 permits the spring 122 to draw the bar 117 in an inward direction, whereby the rack of the bar operates on the gear to change or reverse the position of the weight-impression disk 36. This reversal makes the stud 112 interlock with the recess 116, and the disk 36 is thus brought to a position where the numeral "51" will assume the position formerly occupied by the numeral "1." Should the load now weigh sixty pounds, the shifting adjustment of the poise along the graduated scale-beam until it rests on the numeral "10" will make said scale-beam, in connection with the fifty-pound weight imposed on the hanger 15, weigh exactly sixty pounds, and such adjustment of the poise will through the described train of connections shift the member 36 so as to present the weight-numeral "60" immediately below the impression-plunger. The spring 122 holds the bar 117 in an inwardly-drawn position when the weight 126 is removed; but this weight 126 may be taken off the hanger 15 and restored to its position between the casing 16 and the finger-piece 123, thus reversing the position of the bar 117 and restoring the impression member 36 to its normal position. Of course the patron member 56, the multiple-weight members 48 49, and the dating-stamp may be used in connection with the member 36 when the latter is adjusted by the bar 117.

In Figs. 1 and 20 of the drawings I have shown the poise hanger or ring 14 divided, as at 14ª; but in some cases I prefer to use this split or divided ring in connection with an ordinary scale-beam and an ordinary scale-beam poise, because the divided or split ring is readily interchangeable with the ordinary parts of a standard scale, and such divided ring is especially adapted for use in connection with the traveler herein shown and described.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

It is evident that parts of my invention—that is, certain of the mechanisms which have been shown and described—may be used without the whole.

Although I have described my recording apparatus as especially adapted for use by creameries to keep an individual record of the different quantities of milk which may be delivered from day to day by the number of customers or patrons, yet I do not desire to strictly confine myself to this particular use of the apparatus, because I am aware that the apparatus may be used in connection with weighing-scales adapted to weigh other commodities than milk.

Having thus described my invention, what I claim as new is—

1. In an apparatus substantially such as described, the combination with an impression device, of a weight-impression mechanism including a revoluble disk and a slidable bar each provided with figures arranged in consecutive order and with the figures of one part adapted to be grouped in alined relation to the figures on the other part and to thereby indicate the total weight of the load, means for operating the disk by a shiftable poise, and a patron-impression mechanism having a disk and also having means for shifting said disk independently of either of the weight-impression elements, said disk of the patron-impression mechanism provided with characters which may be brought individually into registering order to the figures on the weight-impression devices, substantially as set forth.

2. In an apparatus substantially such as described, the combination of a weight-impression mechanism comprising a slidable bar and a revoluble disk each having a printing-face and said revoluble disk controllable by adjustment of a scale-beam poise, a patron-impression disk operable independently of the weight-impression mechanism, and adapted to be brought into alined relation to registering characters on the members of the weight-impression mechanism, an impression device in coöperative relation to the printing-faces of the weight and patron mechanisms, and inking devices adapted to produce a printed record in connection with said impression devices, substantially as set forth.

3. In an apparatus substantially such as described, the combination with an impression device, of a patron-impression disk having printing characters, and a weight-impression mechanism having a disk and a bar shiftable independently of each other, said disk having consecutive figures up to a certain number and the bar having numerals of a higher order and arranged to be brought into registering relation to either of the figures of the disk, said bar being arranged between the disk of the weight-impression mechanism and the patron-impression disk, substantially as described.

4. In an apparatus substantially such as described, the combination with an impression device, of a patron-impression disk, a weight-impression mechanism having a revoluble disk and a slidable bar, both in coöperative relation to the impression device and to the patron-impression disk, a scale-poise having operative connection with said disk of the weight-impression mechanism, and means for separately adjusting the bar of the weight-impression mechanism and the patron-impression disk, substantially as described.

5. In an apparatus substantially such as described, the combination of a weight-recording mechanism including a revoluble disk and a slidable bar disposed in coöperative relation one to the other and with said bar shiftable independently of the disk, a scale-poise having operative connection with the disk to adjust the latter separately from the bar, an independently-actuated patron-impression disk arranged contiguous to the parts of the weight-impression mechanism and adapted to be brought into coöperative relation thereto, and an impression device in coöperative relation to the parts of said mechanisms, as and for the purposes set forth.

6. In an apparatus substantially such as described, the combination of a patron-impression disk, an impression device movable relative to said patron-impression disk, and a weight-impression mechanism having two elements disposed in coöperative relation to said impression device, means for controlling one member of the weight-impression mechanism by a scale-poise, the other member of said weight-impression mechanism being disposed in shiftable relation to, and for interposition between, the patron-impression disk and the poise-controlled member of the weight-impression mechanism, and means for operating the patron-impression disk independently of either member of the weight-impression mechanism, as and for the purposes set forth.

7. In an apparatus substantially such as described, the combination of a patron-impression member provided with suitable characters, a weight-impression mechanism including two members, the normally active member of said weight-impression mechanism being controllable solely and automatically by the shifting movement of a scale-poise and provided with weight-indicating figures up to a certain number, one of which figures is adapted to be brought to an index position, and the other member of the weight-impression mechanism being disposed in coöperative relation to said poise-controlled member and provided with figures adapted to be brought into registration with the index position on the figures of said poise-controlled member, means for operating the patron-impression member independently of either member of the weight-impression mechanism and to optionally shift said member for either of its characters to lie in juxtaposition to the index position of the figures on the weight-impression mechanism, and suitable printing devices, substantially as described.

8. In an apparatus substantially as described, the combination with a scale-poise, and a traveler-guide, of a traveler extensible vertically between said poise and the guide, and said traveler having one part thereof loosely fitted to the poise for free movement vertically with respect thereto, a weight-recording mechanism, and connections between the latter and the traveler, substantially as described.

9. In an apparatus substantially such as described, the combination with a patron-impression mechanism, and an impression device, of a poise-actuated traveler, a weight-indicating member having operative connection with the traveler and disposed in position to coact with the impression device, and means for reversing the position of the weight-impression member relatively to the traveler, as and for the purposes set forth.

10. In an apparatus substantially such as described, the combination of a patron-impression mechanism, an impression device movable relatively thereto, a weight-indicating member having certain fixed weight-impression ordinals and adapted for coöperation with the impression device, and two sets of controlling devices substantially such as described operatively connected to the weight-impression member and each adapted to adjust said member into operative relation to the impression devices within certain fixed ratio, as and for the purposes set forth.

11. In an apparatus substantially such as described, the combination of a weight-impression member having figures up to a certain number, poise-actuated means for shifting said member to bring its figures within a limit less than the highest into inscribing position, and means independent of the poise-actuated means for also adjusting the member to a position wherein the poise-actuated means may also bring either of the remaining figures to inscribing position, substantially as described.

12. In a weight-recording apparatus, the combination of a weight-impression mechanism comprising a revoluble disk and a slidable bar disposed in coöperative relation and each having weight-indicating figures, an impression device opposite to said disk and the bar of the weight-impression mechanism, a poise-controlled traveler, means for limiting said traveler to movement in a path parallel to the adjustment of a scale-beam poise, means for connecting the traveler loosely to said poise, operative connections between the traveler and the revoluble disk of the weight-impression mechanism, means for normally holding the slidable bar of the weight-impression mechanism to a position wherein its characters are not in operative relation to other characters on the revoluble disk of the weight-impression mechanism, and means for adjusting said slidable bar to bring its figures into registration to the figures on said disk, substantially as described.

13. In a weight-recording apparatus, the combination of a weight-impression member, a two-part traveler having its members connected together for extensible adjustment in a vertical direction and one of said traveler members provided with means for loosely connecting the same to a scale-beam poise, and means for connecting said traveler with said impression member to actuate the latter, substantially as described.

14. In a weight-recording apparatus, the combination with a weight-impression member, and an impression device, of a traveler connected operatively with said impression device, and foot-pieces attached adjustably to the traveler and arranged to fit a ring or hanger of a scale-poise, substantially as described.

15. In a weight-recording apparatus the combination with a weight-impression member, and an impression device, of an extensible traveler, foot-pieces adjustably attached to the traveler, and means connecting said traveler with said member, substantially as described.

16. The combination with a scale-beam and a poise shiftable thereon, of a traveler provided with forked foot-pieces which are disposed adjacent to the scale-beam to loosely embrace the poise, and adjustable laterally with respect to each other, and a weight-impression member having operative connections with the traveler, substantially as described.

17. The combination with a scale-beam, and a poise, of a traveler provided with foot-pieces arranged on opposite sides of the poise and adjustable laterally with respect thereto, antifriction-rolls operatively arranged in the foot-pieces of the traveler and adapted to ride against the faces of the poise, and a weight-impression member connected with the traveler, substantially as described.

18. In an apparatus substantially such as described, a poise-controlled traveler consisting of two members coupled adjustably together, one of said members having a foot provided with branches which are laterally adjustable, as set forth.

19. In an apparatus substantially such as described, a poise-controlled traveler provided with branches adjustable laterally with respect one to the other, whereby the traveler branches may be fitted to scale-poises of different thicknesses, as set forth.

20. In a weight-indicating apparatus, a weight-impression mechanism comprising a revoluble disk, and a slidable bar, forming a multiple member which is disposed in shiftable relation to the aforesaid disk, combined with means for adjusting said multiple indicating-bar to different predetermined positions relative to the aforesaid disk, and an impression device common to the disk and the bar, substantially as described.

21. In a weight-recording apparatus, a weight-impression mechanism comprising a poise-controlled and revoluble disk provided with consecutively-arranged figures, and a shiftable bar forming a multiple-impression member disposed in shiftable relation to the aforesaid disk and provided with numerals arranged in the same horizontal plane as the figures on said disk and adapted to be brought into registering relation therewith, combined with means for adjusting said slidable bar in a horizontal plane and to certain predetermined positions with relation to the aforesaid disk, and an impression device in operative relation to both impression members, substantially as described.

22. In a weight-recording apparatus, the combination with a revoluble disk having a printing-surface, a bar slidably supported in shiftable relation to said revoluble disk and likewise having a printing-surface, an inking-ribbon traversing the printing-surface of the disk and the bar, and gearing between said disk and a ribbon-roll to actuate the latter automatically, and an impression device mounted to coöperate with the printing-surfaces of the impression devices, substantially as described.

23. In a weight-recording apparatus, the combination of a revoluble weight-impression member, a slidable bar in shiftable relation to said member, means for impelling said bar in one direction, means in active relation to the bar to permit adjustment of the latter to certain predetermined positions under the action of the impelling device, and an impression device in coöperative relation to said member and the bar, substantially as described.

24. In a weight-recording apparatus, the combination of a poise-controlled revoluble disk, a shiftable bar provided with a printing-surface and limited to slidable movement in the horizontal plane of and relative to said member, a spring connected with said bar, and a series of stops in removable relation to the bar and arranged to permit of the adjustment of said bar to variable positions under the action of the spring, substantially as described.

25. In a weight-recording apparatus, the impression devices comprising a revoluble weight-disk, a revoluble patron-disk, and a slidable weight-bar mounted for interposition between the two disks and to have impressions of its characters register with impressions from the characters of the weight-disk, combined with an impression-plunger, and means for actuating the several parts, substantially as described.

26. In a weight-recording apparatus, an impression mechanism for securing a three-part record comprising a revoluble weight member, a revoluble patron member mounted in the transverse plane of the first-named member, and a slidable weight member coöperating with the revoluble weight member and having its active surface in the same plane as the corresponding surface of the aforesaid members, each of said members being shiftable independently of the others, combined with an impression-plunger, and one or more record-tapes, substantially as described.

27. In a weight-recording apparatus, an impression mechanism comprising a revoluble weight-disk, and a slidable weight-bar in coöperative relation to the weight-disk, combined with a guide for said slidable bar, a retractor normally impelling it in one direction, means for limiting the bar to predetermined variable adjustments, and an impression-plunger, substantially as described.

28. In a weight-recording apparatus, the combination with an impression mechanism, of feed-rolls for a record-tape, a dating-table adjacent to said rolls, an inking-ribbon arranged to cross the path of the record-tape and to traverse the dating-table, an impression-plunger, and a dating-stamp carried by the plunger and coöperating with the dating-table, substantially as described.

29. In a weight-recording apparatus, the combination with the poise-actuated impression member and the plunger, of duplicate record-tapes, an endless inked ribbon, and means actuated by the impression member for automatically moving said ribbon in a path across said tapes, substantially as described.

30. In a weight-recording apparatus, the combination with the poise-actuated impression member and the plunger, of duplicate record-tapes, an endless inked ribbon, a friction feed device for the ribbon actuated by the impression member, and an independent feed mechanism for the tapes to move the same in paths at right angles to the ribbon, substantially as described.

31. In a weight-recording apparatus, the combination with the poise-actuated weight-impression member and the plunger, of duplicate record-tapes, an inking-ribbon, a feed mechanism for said tapes actuated by the plunger, another feed device actuated by the impression member for automatically moving the ribbon, and means disposed in the path of one tape to deflect the same laterally with respect to the other tape, substantially as described.

32. In a weight-recording apparatus, the combination with a poise-actuated impression member and the plunger, of a record-tape, a pair of coacting feed-rolls arranged to grip the tape and having operative connections with said plunger to be actuated thereby, an inking-ribbon, and means actuated by the impression member to automatically feed the inking-ribbon, substantially as described.

33. In a weight-recording apparatus, the combination of a revoluble poise-actuated impression member, a slidable impression member movable independently of said revoluble member, an impression-plunger, a divided feed-roll arranged to receive between its parts the slidable impression member, a single feed-roll coöperating with the divided feed-roll and disposed to span and out of the path of the slidable impression member, and an inking device, substantially as described.

34. In a weight-recording apparatus, a divided feed-roll and a single feed-roll coöperating therewith, of the weight and patron impression disks, a slidable weight-impression bar mounted to travel in the space between the divided feed-roll members and the two disks, and a plunger, substantially as described.

35. In a weight-recording apparatus, the combination with an impression member, and a plunger, of a record-tape feed mechanism including a feed-wheel provided with studs, a bar linked to the plunger and having a forked foot disposed in active relation to said feed-wheel, a spring connected to the bar to draw it in one direction, and gearing between the feed-wheel and a roll of said feed mechanism, substantially as described.

36. In a weight-recording apparatus, the combination with an impression member, of an impression-plunger, a record-tape, an inking device, and a dating-stamp carried by said plunger and adapted to coöperate with the inking device and with said record-tape, substantially as described.

37. In a weight-recording apparatus, the combination with an impression member, of a plunger, a dating-stamp carried by the plunger, a stamp-impression table disposed in the path of said dating-stamp, and a tape-feed mechanism, substantially as described.

38. In a weight-recording apparatus, an impression-plunger having a foot, and a dating-stamp carried by the plunger at one side of the foot thereof, combined with an impression member lying in the path of said foot, a stamp-impression table having its active surface in a different horizontal plane from the surface of the impression member, a record-tape, and a feed mechanism, substantially as described.

39. In a weight-recording apparatus, the combination with coöperating impression members, and a feed mechanism, of duplicate record-tapes, a divider-plate having an enlarged foot interposed in the path of one record-tape and forming a tearing edge for said tape, and means for retaining the other record-tape in the apparatus, substantially as described.

40. In a weight-recording apparatus, the combination with a revoluble weight-impression member, and a plunger, of an endless inked ribbon arranged to travel between said member and plunger and a friction-feed mechanism operable by said revoluble member to feed the ribbon, substantially as described.

41. In a weight-recording apparatus, the combination with a revoluble weight-impression member, and a plunger, of a pair of rolls one of which is frictionally geared to said member, and one of said rolls being adjustable with relation to the other roll, and an endless inked ribbon supported by said rolls, substantially as described.

42. In a weight-recording apparatus, the combination with a plunger, and a poise-actuated slide, of a shaft having operative connections with said slide, a weight-impression member clutched to said shaft, and means for reversing the position of said member on the shaft independently of the movement of the shaft by the traveler, substantially as described.

43. In a weight-recording apparatus, the combination with a plunger, and a poise-actuated traveler, of a shaft, connections between the shaft and the traveler, a weight-impression member clutched to the shaft and having an impression-surface arranged to normally be presented at any point within a certain circumscribed area to said plunger on the movement of the traveler, and means in operative relation to said impression member for reversing the same on the shaft to present another portion of its active surface to said plunger, substantially as described.

44. In a weight-recording apparatus, the combination with a plunger, and a traveler, of a shaft, a weight-impression disk provided with a gear and clutched to the shaft, and a slidable bar geared to the gear of the disk, and having means for releasing the clutch connection between said disk and shaft, substantially as described.

45. In a weight-recording apparatus, the combination with a plunger, and a traveler, of a shaft, a weight-impression disk, a slidable bar geared to the disk, means for locking the disk in either of two positions on said shaft, and releasing devices carried by the bar and arranged to free the locking devices previous to rotation of the disk by the bar, substantially as described.

46. In a weight-recording apparatus, the combination with a plunger, and a traveler, of a shaft, a clutch-disk fast with the shaft and having a groove and the locking recesses, an impression-disk loosely mounted on the shaft and provided with a stud adapted to either of said recesses, a bar operatively connected to said disk to turn the latter, and a releasing-plate carried by the bar and arranged to lift said disk and to maintain the same in an elevated position during the period of turning the disk by the movement of the bar, substantially as described.

In witness whereof I have hereunto set my hand in the presence of two witnesses.

LOUIS V. LABELLE.

Witnesses:
S. H. LEBLANC,
J. G. DUGAS.